Patented Mar. 2, 1948

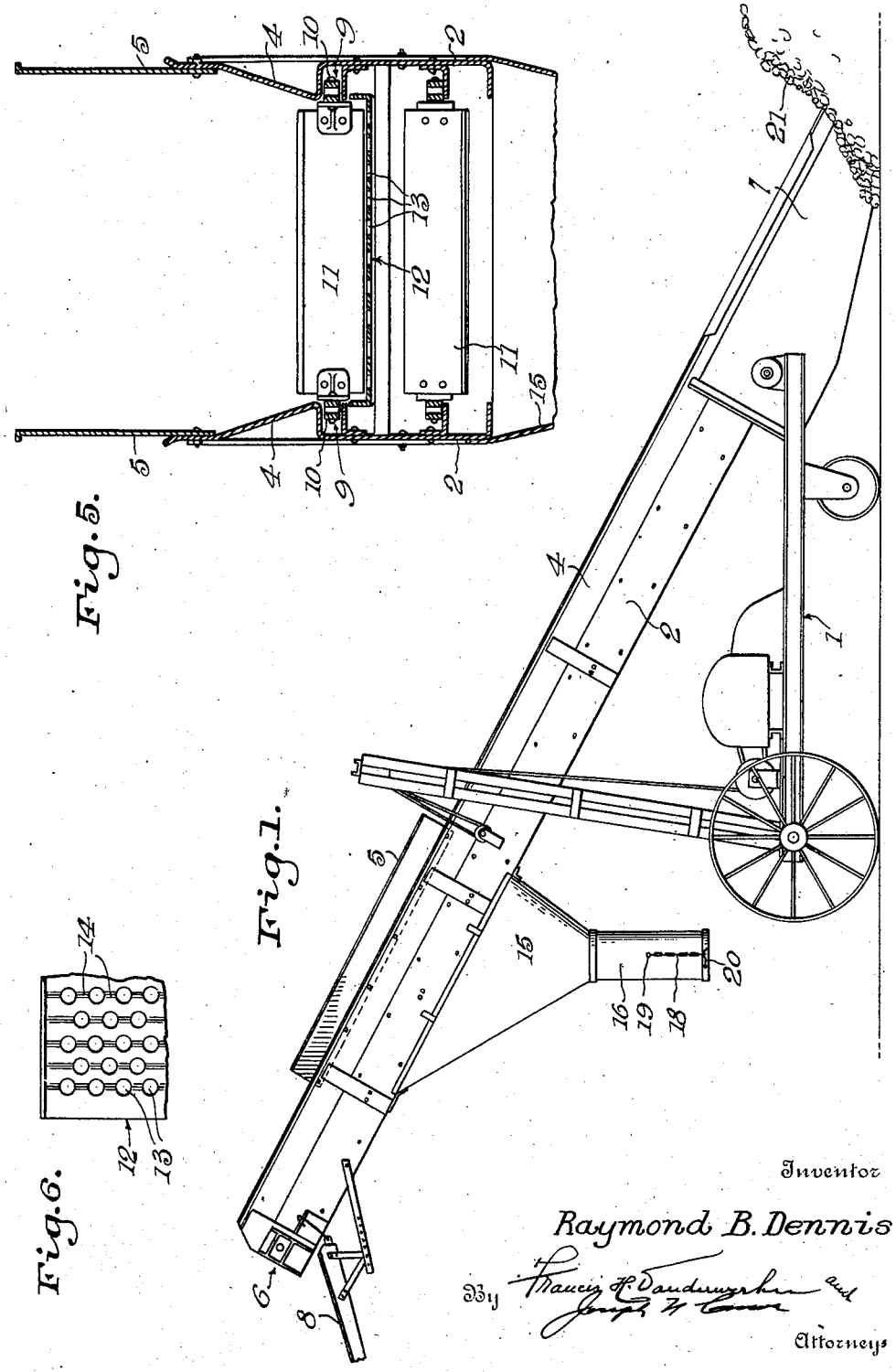

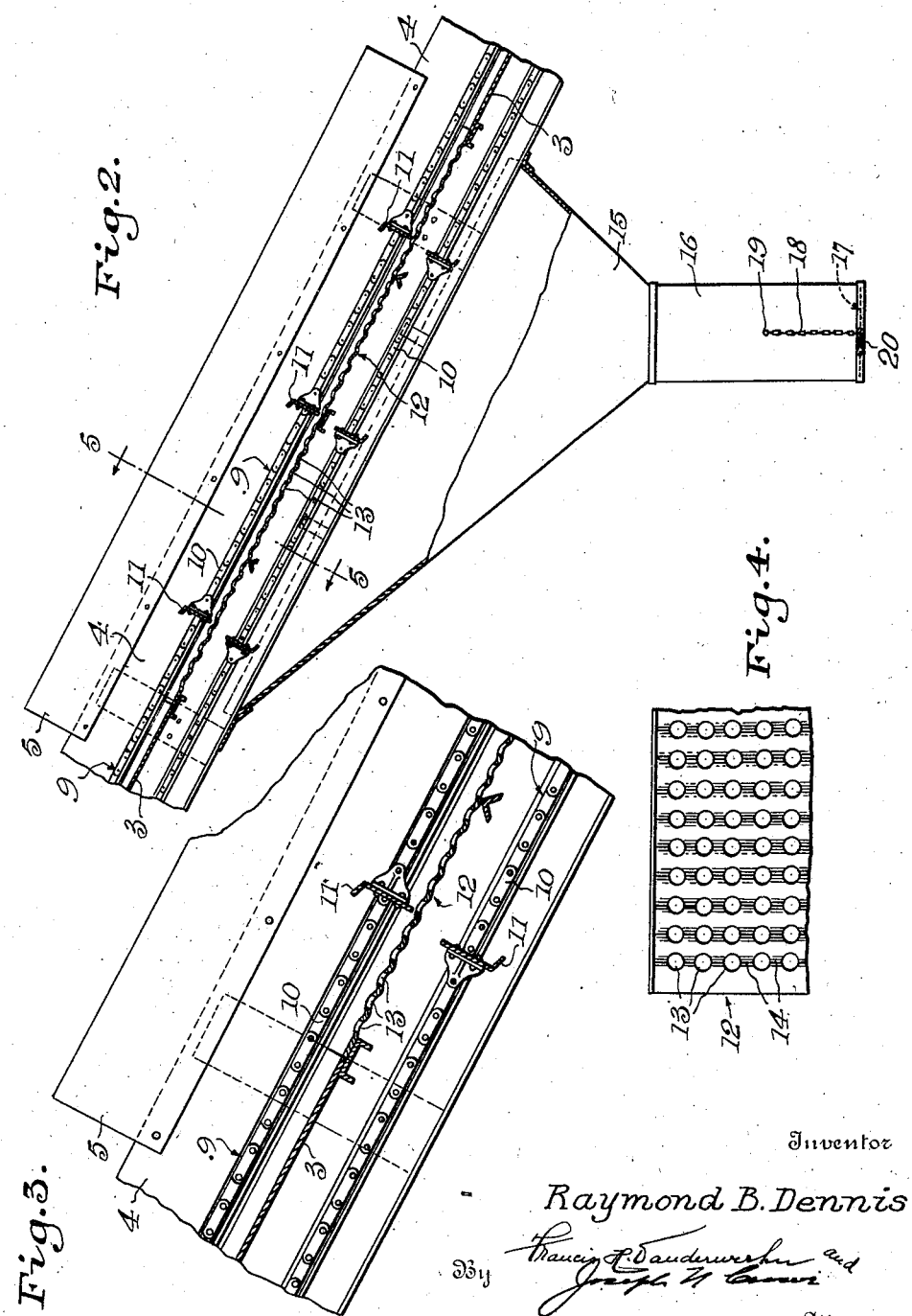

2,436,795

UNITED STATES PATENT OFFICE 2,436,795

MATERIAL CONVEYING AND SCREENING MACHINE

Raymond B. Dennis, Camp Blanding, Fla.

Application May 16, 1945, Serial No. 594,128

1 Claim. (Cl. 209—357)

(Granted under the act of March 3, 1883, as amended April 30, 1928; 370 O. G. 757)

The invention described herein may be manufactured and used by or for the Government for governmental purposes, without payment to me of any royalty thereon.

This invention relates to a material conveying machine and more particularly is directed to a device of this character for grading or screening coal.

One of the objects of the invention is to provide a screening device for a coal conveying machine which is adapted to separate automatically coal fines and dust from lump coal in one operation while the coal passes through the coal conveying machine.

Another object of the invention is to provide an improved screen for a coal separating machine which forms a part of the floor of an inclined elevating conveyor frame including an endless flight paddle drag conveyor, wherein the screen is positioned at a predetermined distance from the delivery end of the conveyor frame preferably between the mid-point of the frame and the delivery end thereof.

Another object of the invention is to provide an improved screen for a coal conveying machine of the endless flight paddle conveyor type, wherein the screen comprises a perforated plate having a corrugated surface.

Another object of this invention is to provide an improved perforated plate type screen for a coal conveying machine of the endless flight paddle conveyor type wherein the perforated plate is corrugated to provide a plurality of faces on the plate positioned at varying angles with respect to the flight paddles whereby a rippling motion is given to the coal as it is dragged by the flight paddles over the screen, thus causing an agitation of the coal and separation of the coal screenings from the lump coal.

Another object of the invention is to provide an improved elevating conveying machine including a perforated plate type screen forming a portion of the floor of the conveyor and positioned intermediate the mid-point and delivery end of the conveyor and flight paddles associated therewith and adapted to move over the upper surface of the floor including said screen, the screen being so constructed that the coal upon being moved over the screen by the conveyor has a stirring or churning motion imparted thereto, thus cleaning and recleaning the coal as it is dragged over the screen by the oncoming flight paddles of the conveyor prior to the screened coal being expelled upon reaching the delivery end of the conveyor.

Briefly stated, the invention comprises a coal conveying machine including an inclined elevating conveyor frame provided with a receiving end and a delivery end and having an endless drag conveyor containing flight paddles mounted thereon and adapted to move over the upper face of the bottom of the conveyor. An improved coal screen forming a portion of the bottom of the conveyor frame is arranged between the mid-point of the conveyor frame and the delivery end thereof. The screen comprises a slightly corrugated perforated plate adapted to provide a plurality of faces positioned at varying angles with respect to the flight paddles as they move over the upper surface of the screen, whereby a rippling motion is given to the coal as it is dragged by the flight paddles of the conveyor over the screen, thus causing an agitation of the coal and separation of the coal screenings from the lump coal.

The coal screenings are sifted through to a collecting hopper into a sleeve chute that deposits the screenings into a receptacle placed beneath the chute. The clean coal or larger selection that does not go through the screen but passes thereover is delivered by the conveyor to a separate pile or to a receptacle for delivery, as the occasion may require.

Heretofore no means were provided in an elevating type coal conveyor machine for screening and loading coal at the same time, whereas in this improved arrangement of the screen at a predetermined distance from the delivery end of the conveyor frame, preferably between the mid-point of the conveyor and the delivery end thereof, the lump coal may be loaded onto a truck or the like and the coal screenings taken therefrom prior to reaching the delivery end of the conveyor, whereby loading and screening of the coal may take place simultaneously. By this means the coal screenings may be separately extracted from the lump coal for use in automatic stokers and also a superior quality of lump coal is obtained for hand-fired furnaces used in heating buildings and the like. Thus, by withholding the screenings of fine coal from being used in an open grate hand-fired receptacle, a large saving is effected on the life and service of the grates and fire boxes of space heaters and allowing the clean lump coal to give a much better combustion and a higher percentage of heat units for the lump coal used. The salvaged fine screening up to approximately three-quarters inch size may be used in high pressure boiler stokers or manufactured into brick form for residences.

With the above and other objects and advantages thereof in view, the invention consists of certain features of construction and operation of parts, which will hereinafter be described and shown in the accompanying drawings in which:

Fig. 1 is a side elevation of an elevating coal conveyor embodying the invention;

Fig. 2 is an enlarged fragmentary partly sectional view in elevation of one portion of the elevating coal conveyor showing a screen forming a portion of the floor of a conveyor frame, and a collecting hopper including a sleeve chute mounted on the conveyor frame beneath the screen;

Fig. 3 is an enlarged fragmentary sectional view thereof with the collecting hopper and sleeve chute removed therefrom;

Fig. 4 is a fragmentary top plan view of a portion of the corrugated screen having aligned perforations therein;

Fig. 5 is an enlarged fragmentary sectional view taken on line 5—5 of Fig. 2; and Fig. 6 is a fragmentary top plan view of a portion of a modified form of screen with the perforations therein being offset.

Referring more specifically to the drawings, the improved coal conveying machine comprises a wheeled carriage or support 1 having an inclined elongated elevating conveyor frame 2 including a floor 3 and sides 4 mounted thereon. The sides 4 are provided with longitudinally extending metal guard members or extensions 5 secured thereto at a predetermined distance from the upper or delivery end 6 of the conveyor frame 2 as hereinafter described. The lower end of the conveyor frame 2 is provided with a depressed extension or apron 7 adapted to be inserted in a coal pile and the delivery end 6 of the conveyor frame is provided with an adjustable chute 8 adapted to maintain its position over the top of a truck (not shown) or the like. An endless conveyor 9 is mounted on the conveyor frame 2 and includes suitably driven endless chains 10, with flight paddles 11 secured at proper intervals thereto.

An improved longitudinally extending coal screen 12 which may be in the form illustrated in Figs. 4 or 6 and to which this invention is particularly directed, is arranged at a predetermined distance, preferably six feet from the delivery end 6 of the elevating conveyor. This screen portion which is a section of the floor 3 of the elevating conveyor is preferably made of sheet metal material to conform in size and weight of corresponding material used in the floor. The screen plate 12 is provided with perforations or holes 13 drilled to the desired size of coal to be separated, which perforations 13 may be in alignment as in Fig. 4 or off-set from each other as shown in Fig. 6. The portions 14 surrounding the perforations 13 of the screen 12 are slightly corrugated to provide an undulating or rippled surface as will hereinafter be described, with the perforations 13 formed in the crests of the corrugations.

The metal guard members or extensions 5 are secured to the sides 4 of the conveyor frame 2 adjacent to and above each side of the screen 12 for a purpose which will hereinafter appear. Underneath the screen portion 12 is a collecting hopper 15 suitably secured to the conveyor frame, with a sleeve chute or dispelling sleeve 16 provided on the lower end of the collecting hopper. A damper shut-off 17 is pivoted off-center to the lower end or mouth of the dispelling sleeve 16, the damper shut-off 17 being adapted to be held in a closed position by means of a chain 18 secured at one end at 19 to the sleeve 16 and hooked over the handle 20 of the damper at its other end.

In operation, assuming that the elevating coal conveyor is in a position near a coal pile 21 to be screened, with the extension 7 of the conveyor frame 2 engaging the coal pile 21 as illustrated in Fig. 1, upon starting the endless conveyor 9, the flight paddles 11 thereon drag the coal upwardly on the floor 3 of the conveyor frame and thence over the screen 12. Since the portions 14 of the screen surrounding the perforations 13 are slightly corrugated and the plate thereby provided with a plurality of faces positioned at various angles with respect to the flight paddles moving against the screen, the coal is given a rippling or churning motion as it is propelled over the screen, thus causing the coal to be agitated and thoroughly screened. The screened coal sifts into the collecting hopper 15 underneath the screen into the sleeve chute 16 that may deposit the coal screenings into a receptacle (not shown). It would be preferable, however, if the coal screenings were deposited onto an auxiliary conveyor of smaller capacity than the main conveyor and passed off into a separate pile. The damper shut-off 17 at the mouth of the chute 16 is adapted to retain the coal screenings temporarily if the coal screenings are transferred to a stock pile by wheelbarrows, thus permitting intermittent withdrawal of fines from the chutes. Otherwise, an auxiliary conveyor may be used to divert the coal screenings to a second loading vehicle or stock pile. The side guards 5 prevent the coal from overflowing the portions of the sides 4 of the conveyor frame 2 adjacent to the screen 12 during the screening of the coal, since there is a tendency to pile up the coal while passing over the screen.

It is apparent from the foregoing description that the churning turbulent motion imparted to the coal by the corrugated screen cleans and re-cleans the coal as it is caught up by the oncoming flight paddles and forced over each corrugation. The screened coal is thereafter conducted by the flight paddles to the delivery end 6 of the conveyor where it is expelled onto the adjustable chute 8 permitting the screened coal to pass off into a separate pile or to a receptacle for delivery as the occasion may require.

It will thus be seen that there is herein provided a novel and efficient form of coal conveying machine which is well adapted for the purpose intended. Even though there has herein been shown and described the invention as comprising certain features of construction and operation of parts, it is nevertheless to be understood that various changes may be made therein, if the changes do not depart from the spirit or scope of the claim.

Having thus described my invention, what I claim as new and wish to secure by Letters Patent is:

A material conveying machine comprising the combination with a carriage, of conveying mechanism supported thereon including a material receiving end and a delivery end and having a floor and side walls, a screen section positioned between the mid-point of the conveyor frame and the delivery end thereof and forming a portion of the floor, an endless flight conveyor including spaced, upstanding, rigidly mounted flight paddles having plane conveying surfaces operatively arranged on the frame and extending entirely across the floor transversely thereof for conveying material from the receiving end over the screen to the delivery end, whereby the material is screened prior to reaching the delivery end, the screen being provided with a plurality of spaced transversely extending corrugations crossing the screen in one transverse direction only, the corrugations having their crests parallel to the conveying surfaces of the flight paddles and having aligned perforations therein disposed along the crest of each corrugation, whereby the material is given a rippling motion as it is conveyed over each corrugation of the screen by the flight paddles, thereby agitating the material for separating certain size material from the remainder thereof, the flight paddles moving across the screen in a plane continuously parallel to the plane of the crests of the corrugations.

RAYMOND B. DENNIS.

REFERENCES CITED

The following references are of record in the file of this patent:

UNITED STATES PATENTS

| Number | Name | Date |
| --- | --- | --- |
| 473,957 | Pollock | May 3, 1892 |
| 547,140 | Cross | Oct. 1, 1895 |
| 744,696 | Silvis et al. | Nov. 17, 1903 |
| 807,954 | Moore | Dec. 19, 1905 |
| 1,635,925 | Carlson | July 12, 1927 |
| 2,150,717 | Jaxon | Mar. 14, 1939 |
| 2,267,419 | Oster | Dec. 23, 1941 |